United States Patent [19]
Takegami et al.

[11] Patent Number: 5,293,776
[45] Date of Patent: Mar. 15, 1994

[54] CYLINDER DISCRIMINATING SENSOR LAYOUT

[75] Inventors: Masaki Takegami; Hideaki Ueda, both of Iwata, Japan

[73] Assignee: Yamaha Hatsudoki Kabushiki Kaisha, Iwata, Japan

[21] Appl. No.: 837,805

[22] Filed: Feb. 18, 1992

[30] Foreign Application Priority Data

Mar. 15, 1991 [JP] Japan .................................. 3-76805

[51] Int. Cl.⁵ .......................................... G01M 15/00
[52] U.S. Cl. ................................. 73/119 R; 123/414; 123/617; 324/207.25

[58] Field of Search ................... 73/117.3, 116, 119 R; 123/414, 612, 617; 324/207.25, 179; 33/1 N; 336/30

[56] References Cited

U.S. PATENT DOCUMENTS 4,338,903  7/1982  Bolinger ........................ 128/414 X Primary Examiner—Jerry W. Myracle
Attorney, Agent, or Firm—Knobbe, Martens, Olson & Bear

[57] ABSTRACT

A sensor arrangement for an internal combustion engine so as to provide a signal when one cylinder of the engine is at a pre-determined position. The sensor arrangement includes an inductive sensor that is mounted directly in the cam cover of the engine and which cooperates directly with one of the cam lobes.

20 Claims, 4 Drawing Sheets

CYLINDER DISCRIMINATING SENSOR LAYOUT

BACKGROUND OF THE INVENTION

This invention relates to a cylinder discriminating sensor layout and more particularly to an improved arrangement for providing a signal indicative of the phase relationship of an internal combustion engine.

As is well known, many controls for an internal combustion engine are dependent upon the phase angle of the output shaft of the engine. Where multiple cylinder engines are employed, it is also necessary to determine not only the phase angle of the output shaft but which cylinder is at its top dead center position at a given point in time. Alternatively, a reference signal is generated when one cylinder of the engine is at top dead center so that the control system can discriminate which cylinder is firing at a given phase angle of the engine output shaft.

Sensors of the aforenoted types are normally mounted in proximity to the output shaft of the engine. However, such measurements directly from the engine output shaft have some disadvantages. The first of these disadvantages is that the crankshaft of the engine is normally a relatively inaccessible component and if the sensors are mounted in proximity to the crankshaft they also become inaccessible. Furthermore, it is very difficult to check the conditions of these sensors and/or the wire leads leading to them when such remote positioning is employed.

In addition to these disadvantages, when the engine operates on a four stroke cycle, not only is it necessary to determine when a given cylinder is at its top dead center position but also whether this cylinder is at top dead center at a time when it is fired or when it is merely completed the end of its exhaust stroke and the beginning of the next intake stroke. This problem may be avoided by operating the sensors off of another shaft that is driven from the crankshaft at one half engine speed. However, such additional shaft drives not only complicate the construction but also give rise to problems in where the sensors will be located.

It is, therefore, a principal object to this invention to provide a cylinder discriminating sensor layout for an internal combustion engine wherein the sensor is positioned in a readily accessible area.

It is a further object to this invention to provide a cylinder discriminating sensor layout for an internal combustion engine wherein the sensor cooperates with a shaft of the engine which is normally driven at one half engine output shaft speed but which does not require the use of an auxiliary shaft solely for the sensor.

It is a further object to this invention to provide an improved mounting arrangement for an internal combustion engine sensor that places the sensor in an easily accessed position and also places the sensor where it can not be contaminated and the leads going to it can be readily inspected.

A further problem with sensors of the afornoted types is that the mounting of not only the sensor but also the element on the shaft with which it cooperates is critical. That is, if the sensor is not mounted accurately, then the timing positions will be incorrect. Furthermore, sensors of the types previously proposed have required the provision of a sending element that is fixed to the shaft with which the sensor cooperates. If this element is not correctly positioned on the shaft, timing errors can also result.

It is, therefore, a further object to this invention to provide an improved sensor arrangement for an engine wherein the sensor can cooperate with an element of the engine rather than a separate part which must be fixed to an element of the engine.

It is well known in four cycle engines to drive the camshafts at one half engine speed. Therefore, the camshafts themselves provide a readily accessible shaft which is driven at one half engine speed and which can provide the necessary sensor arrangement without necessitating an additional shaft. However, sensor arrangements that cooperate with engine camshafts have, heretofore, required the provision of an additional element on the camshaft to cooperate with the sensor to provide a signal.

It is, therefore, a still further object to this invention to provide an improved sensor arrangement for an internal combustion engine wherein the sensor signals are derived directly from a cam lobe of the camshaft.

A further disadvantage of previously proposed sensor arrangements for cooperation with the camshafts of engines has been that the sensor itself has been mounted either within the cam cover of the engine and/or on some element that places the sensor in a awkward or difficult place to access, such as the cylinder head or the like.

It is, therefore, a still further object to this invention to provide an improved sensor arrangement for cooperation with the camshaft and wherein the sensor is carried directly by the cam cover of the engine.

SUMMARY OF THE INVENTION

A first feature of this invention is adapted to be embodied in a sensor for indicating the phase of an internal combustion engine which comprises an engine output, a camshaft and means for driving the camshaft from the engine output shaft. The camshaft has at least one lobe thereon for operating a poppet valve of the engine. A sensor is fixed to the engine in proximity to the cam lobe for providing an output signal when the cam lobe passes the sensor.

Another feature of the invention is adapted to be embodied in a sensor for indicating the phase of an overhead camshaft internal combustion engine that comprises a cylinder head rotatably journaling a camshaft and wherein the camshaft is enclosed with in a cam cover affixed to the cylinder head. A sensor is carried by the cam cover and has a sensor portion in proximity to the camshaft for providing a signal indicative of the position of the camshaft.

DETAILED DESCRIPTION OF THE PREFERRED EMBODIMENTS OF THE INVENTION

Figure 1:
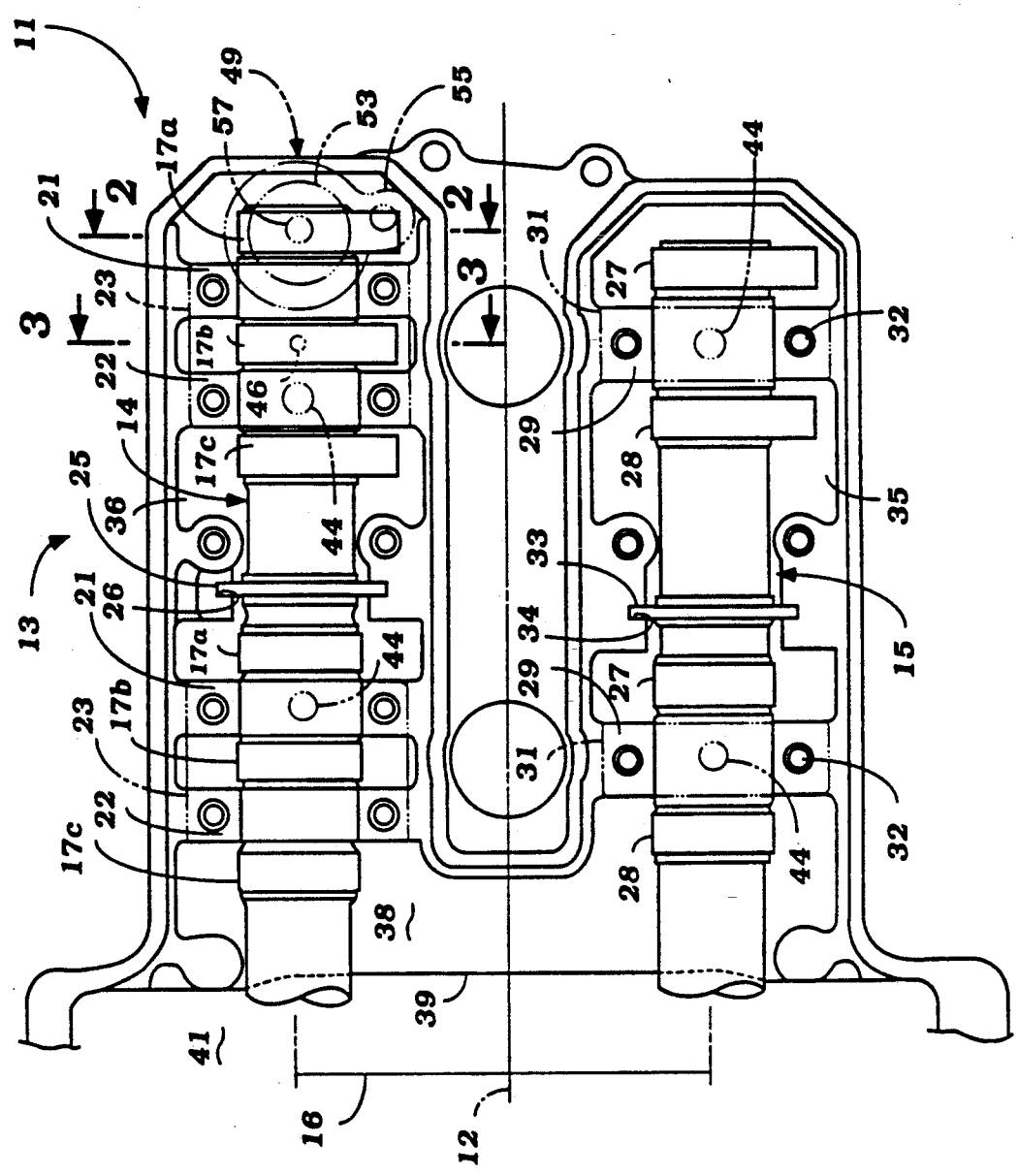
FIG. 1 is a top plan view of a portion of an internal combustion engine constructed in accordance with a first embodiment of the invention, with the cam cover and camshaft bearing caps removed but certain portions of them shown in phantom for orientation purposes.
Figure 2:
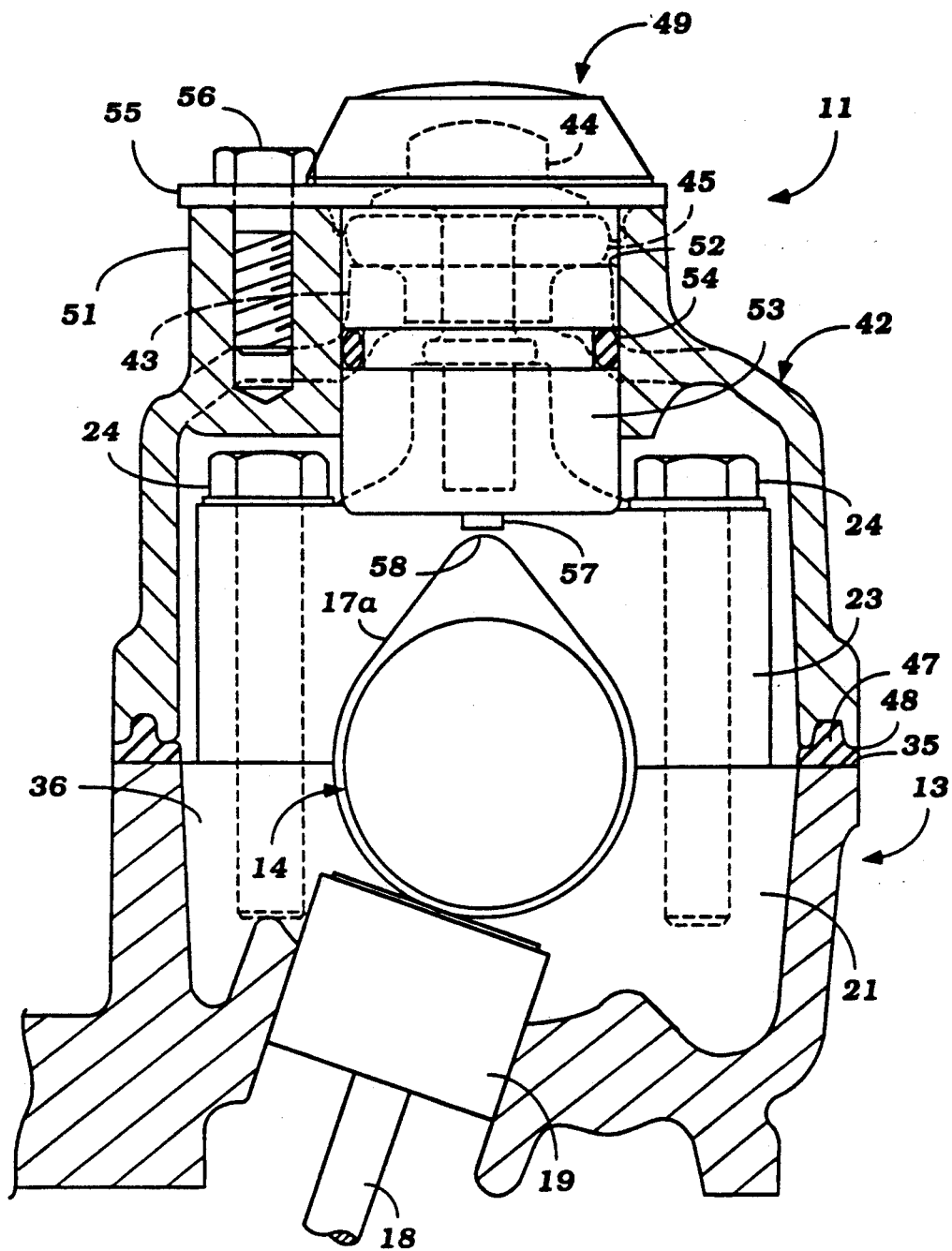
FIG. 2 is an enlarged cross sectional view taken along the line 2—2 of FIG. 1.
Figure 3:
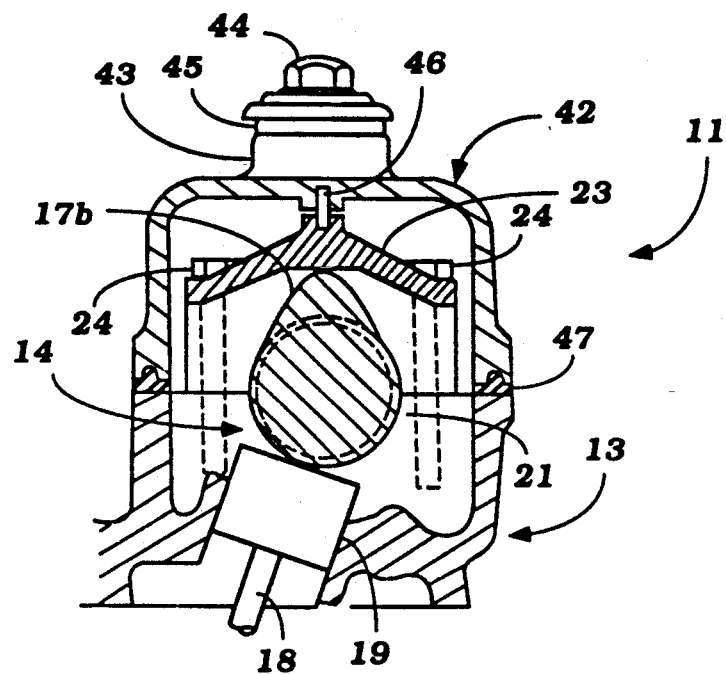
FIG. 3 is a cross sectional view taken along the line 3—3 of FIG. 1.

Referring now in detail to the drawing and initially to the embodiment of FIGS. 1 through 3, an internal combustion engine having a sensor arrangement constructed in accordance with an embodiment of invention is identified generally by the reference numeral 11. Since the invention deals primarily with the sensor layout, which cooperates with the camshafts of the engine, only this portion of the engine has been shown in detail. Where components of the engine are not illustrated or described, they may considered to be conventional.

In the illustrated embodiment, the engine 11 is comprised of either a two cylinder in-line engine or a four cylinder V-type engine, only one bank of which is shown. However, it should be readily apparent to those skilled in the art how the invention can be employed in conjunction with engines have other cylinder numbers and other cylinder configurations. However, the invention has particular utility in conjunction with multiple cylinder engines operating on a four cycle principal wherein it is desired to be able to discriminate when a reference cylinder is at a reference position, such as top dead center.

The engine 11 includes a cylinder block, crankcase assembly which may be of any known type and in which a plurality of pistons are provided for driving a crankshaft, indicated schematically at 12 in FIG. 1 in a well known manner. As has been noted above, this construction may be considered to be conventional.

A cylinder head assembly, indicated generally by the reference numeral 13 is affixed to the associated cylinder block also in a well known manner. Journalled for rotation in the cylinder head assembly 13 are a pair of camshafts 14 and 15, which camshafts are the intake and exhaust camshafts, respectively. The camshafts 14 and 15 are driven from the engine crankshaft 12 by a drive, represented schematically by the line 16 and which may comprise any know type such as a chain, belt or gears and in which the camshafts 14 and 15 are driven at one half speed of the rotational speed of the crankshaft 12. This speed reduction may be achieved through one or more reduction phases.

In the illustrated embodiment, the engine 11 is of the five valve type having three intake valves for each cylinder and two exhaust valves for each cylinder. Of course, the invention can be employed with engines having other types of valving arrangements and need not be limited to a twin overhead camshaft arrangement.

For operating the three intake valves associated with each cylinder, the intake camshaft 14 has cam lobes 17A, 17B and 17C each of which directly operate a respective one of the intake valves, shown at 18 in FIG. 2 through a thimble tappet 19 in a well known manner.

The cylinder head 13 itself is provided with pair of bearing surfaces 21 and 22 for each cylinder which surfaces 21 and 22 are disposed between the center cam lobe 17B and the end cam lobes 17A and 17C, respectively. A bearing cap, shown in phantom in FIG. 1 and in solid lines in FIGS. 2 and 3 and identified by the reference numeral 23 are affixed to the cylinder head 13 adjacent each cylinder by means of threaded fasteners 24 which may either comprise bolts or stud and nut assemblies. The bearing caps 23 and cylinder head bearing surfaces 21 and 22 complete the rotational support for the intake camshaft 14.

The intake camshaft 14 is provided with a thrust flange 25 that is received within a thrust groove 26 formed in the cylinder head 13 so as to provide axial positioning for the intake camshaft 14.

The exhaust camshaft 15, since it operates only two valves per cylinder, is provided with pairs of cam lobes 27 and 28 which cooperate with thimble tappets for operating the stems of the exhaust valves (not shown) in a well known manner. The cylinder head 13 is provided with bearing surfaces 29 that are disposed between the cam lobes 27 and 28 associated with each cylinder. A bearing cap 31, shown in phantom in FIG. 1, is affixed to the cylinder head 13 for each cylinder by fasteners 32 so as to complete the rotational support for the exhaust camshaft 15.

Like the intake camshaft 14, the exhaust camshaft 15 has a thrust flange 33 that is received in a thrust groove 34 of the cylinder head 13 so as to provide axial positioning for the exhaust camshaft 15.

The upper surface of the cylinder head 13 is provided with a peripheral flange 35 which in essence defines an intake cam chamber 36 in which the intake camshaft 14 is positioned and an exhaust cam chamber 37 in which the exhaust camshaft 15 is positioned. These cam chambers 36 and 37 are joined at their forward ends by a transverse chamber 38 which is formed to the rear of a front wall 39 of the cylinder head 13 which defines a chamber 41 in which the cam drive 16 is positioned.

A cam cover, indicated generally by the reference numeral 42 is affixed to the cylinder head 13 in a manner to be described and encloses the chambers 36, 37 and 38 as well as the cam drive chamber 41. The cam cover 42 has raised boss portions 43 formed over adjacent portions of the intake cam bearing caps 23 and the exhaust cam bearing caps 31. Threaded fasteners such as bolts 44 pass through holes in these boss portions 43 and are threaded into tapped holes formed in the bearing caps 23 and 31 so as to affixed the cam cover 42 to the cylinder head 13. Elastic washers 45 are disposed around the upper surface of the bosses 43 so as to provide against lubricant leakage from within the chambers 36, 37, 38 and 41.

One or more locating pins 46 are disposed to cooperate between one or more of the bearing caps 23 and/or 31 and the cam cover 42 so as to provide accurate location of the cam cover. The reason for this is because of the fact that the position sensor, to be described, is mounted in the cam cover 42.

A gasket 47 is interposed between the cylinder head surface 35 and a corresponding surface 48 of the cam cover 42 so as to complete the peripheral sealing of the chambers 36, 37, 38 and 41.

Except for the locating pins 46, the construction as thus far described may be considered to be conventional. In accordance with the invention, however, a sensor assembly, indicated generally by the reference numeral 49 is carried in the cam cover 42 in a manner to be described and cooperates with one of the cam lobes, in this embodiment the lobe 17A, so as to provide a signal when the piston associated with this cam lobe is at its top dead center position.

To this end, the cam cover 42 is provided with a further boss 51 in which a bore 52 is provided. The sensor 49 has a cylindrical portion 53 that is received within the bore 52 and which has a circumferential groove therein carrying an O-ring seal 54 for sealing. The sensor 49 further has a flanged portion 55 that is provided with a bore to receive a locating bolt 56 that is threaded into the cam cover boss 51 so as to fix the angular position of the sensor 49.

The sensor 49 is of the inductive type and includes a core 57 that is surrounded by a winding (not shown) contained within the cylindrical portion 53. This core 57 cooperates with the tip 58 of the cam lobe 17A to provide an electrical signal when the cam lobe 17A passes the core 57. This type of sensor is well known and, for that reason, a further description of it is believed to be unnecessary.

By mounting the sensor 49 in the cam cover 42, the sensor 49 is readily accessible and can be viewed as well as the terminals going to it. In addition, this positioning of the sensor 49 removes it from the contaminants which may be found at the lower portion of the engine. Furthermore, since the core 57 operates directly with the tip 58 of the cam lobe 17A, it is not necessary to fix another element to the camshaft to provide the signal and thus accuracy is further improved. Furthermore, since the camshaft 14 is already driven at one half engine speed, the circuitry associated with the sensor 49 need not discriminate which cycle the engine is on when the top dead center is reached.

Figure 5:
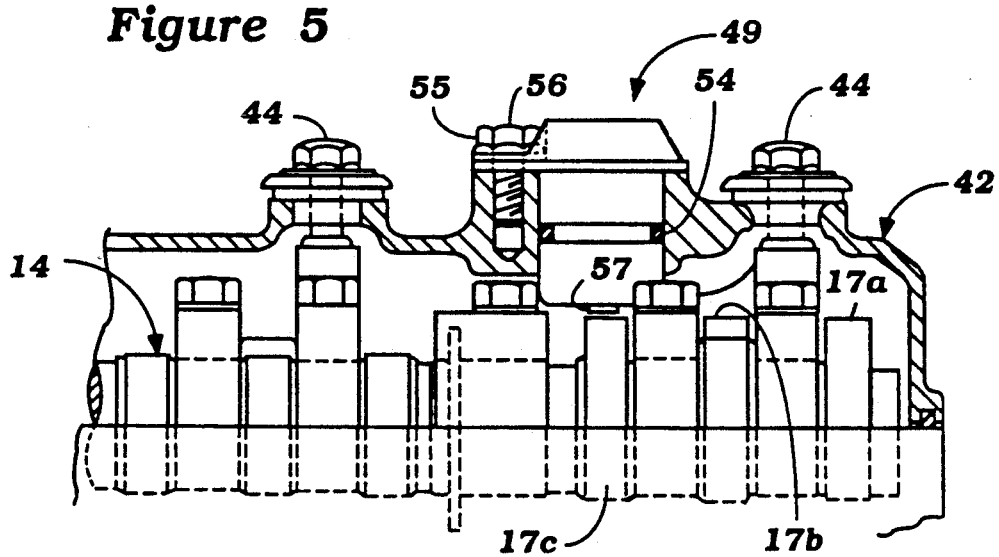
FIG. 5 is a cross sectional view taken along the line 5—5 of FIG. 4.
Figure 4:
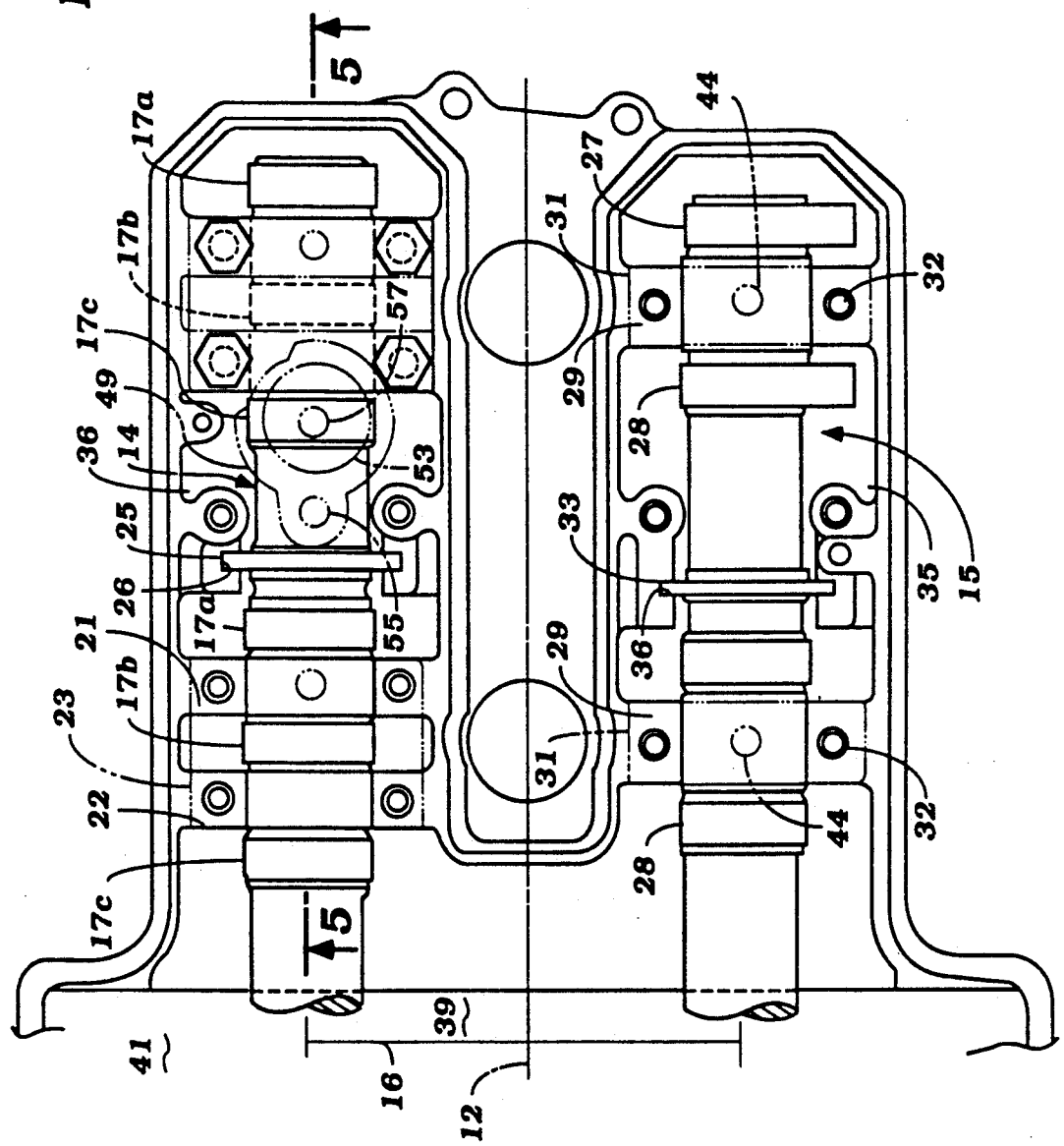
FIG. 4 is a top plan view, in part similar to FIG. 1 and with the same components removed and shown in phantom, but illustrates another embodiment of the invention.

In the embodiment of FIGS. 1 through 3, the sensor 49 that is mounted at the end cam lobe of the end cylinder of the cylinder head 13. Of course, it should be understood that the sensor 49 could be mounted at any cam lobe associated with the cylinder which top dead center sensing is desired and FIGS. 4 and 5 show an embodiment where rather than being mounted contiguous to the cam lobe 17A and cooperating with it, the sensor 49 is mounted contiguous to and cooperates with the cam lobe 17C of the same cylinder. Because the construction of this embodiment is otherwise the same, further description of this embodiment is not believed to be necessary and the similarity is such that the same or substantially the same components have been identified by the same reference numerals and further description of this embodiment is, therefore, not believed to be necessary.

In view of the foregoing, it should be readily apparent that the described embodiments of the invention provide a very good and accurate sensor arrangement which cooperates directly with the cam lobes of the engine and is mounted directly in the cam cover for ease of servicing and inspection. Of course, the foregoing description is that of preferred embodiments of the invention and various changes and modifications may be made without departing from the spirit and scope of the invention, as defined by the appended claims.

We claim:

1. A sensor for indicating the phase of an internal combustion engine comprising an engine output shaft, a camshaft, means for driving said camshaft from said engine output shaft, said camshaft having at least one lobe thereon for operating a poppet valve of said engine, and a sensor fixed to said engine in proximity to said cam lobe for providing an output signal when said cam lobe passes said sensor.

2. A sensor for indicating the phase of an internal combustion engine as set forth in claim 1 wherein the sensor is an inductive type of sensor.

3. A sensor for indicating the phase of an internal combustion engine as set forth in claim 1 wherein the sensor operates directly with the cam lobe for providing the signal when the cam lobe passes the sensor.

4. A sensor for indicating the phase of an internal combustion engine as set forth in claim 3 wherein the sensor is an inductive type of sensor.

5. A sensor for indicating the phase of an internal combustion engine as set forth in claim 1 further including a bearing surface on the camshaft adjacent the cam lobe and a bearing cap affixed to the engine for journaling the camshaft bearing surface.

6. A sensor for indicating the phase of an internal combustion engine as set forth in claim 5 wherein the sensor is carried by a component of the engine other than the bearing cap.

7. A sensor for indicating the phase of an internal combustion engine as set forth in claim 6 wherein the sensor operates directly with the cam lobe for providing the signal when the cam lobe passes the sensor.

8. A sensor for indicating the phase of an internal combustion engine as set forth in claim 7 wherein the sensor is an inductive type of sensor.

9. A sensor for indicating the phase of an internal combustion engine as set forth in claim 1 wherein the engine includes a cylinder head and the camshaft is journalled for rotation in the cylinder head and operates a valve in the cylinder head from the cam lobe.

10. A sensor for indicating the phase of an internal combustion engine as set forth in claim 9 wherein the sensor is mounted to cooperate with the side of the camshaft opposite to the valve operated from the cam lobe.

11. A sensor for indicating the phase of an internal combustion engine as set forth in claim 10 further including a cam cover affixed to the cylinder head and encloses the camshaft, the sensor being mounted in said cam cover.

12. A sensor for indicating the phase of an internal combustion engine as set forth in claim 11 further including a bearing surface on the camshaft adjacent the cam lobe and a bearing cap affixed to the engine for journaling the camshaft bearing surface.

13. A sensor for indicating the phase of an internal combustion engine as set forth in claim 12 wherein the sensor operates directly with the cam lobe for providing the signal when the cam lobe passes the sensor.

14. A cylinder head arrangement as set forth in claim 1 wherein the sensor operates directly with the cam lobe for providing the signal when the cam lobe passes the sensor.

15. A cylinder head arrangement as set forth in claim 14 wherein the sensor is an inductive type of sensor.

16. A cylinder head arrangement for an overhead valve, internal combustion engine having an output shaft, a camshaft journalled in said cylinder head and having a cam lobe for operating at least one valve therein, means for driving said camshaft from said engine output shaft at one half engine output shaft speed, a cam cover affixed to said cylinder head and enclosing said camshaft, and a sensor carried by said cam cover and in proximity to said cam lobe for providing an output signal when said cam lobe passes said sensor.

17. A cylinder head arrangement as set forth in claim 16 wherein the sensor is an inductive type of sensor.

18. A cylinder head arrangement as set forth in claim 16 further including a bearing surface on the camshaft adjacent the cam lobe and a bearing cap affixed to the engine for journaling the camshaft bearing surface.

19. A cylinder head arrangement as set forth in claim 18 wherein the sensor operates directly with the cam lobe for providing the signal when the cam lobe passes the sensor.

20. A cylinder head arrangement as set forth in claim 19 wherein the sensor is an inductive type of sensor.

* * * * *